(12) United States Patent
Hatae et al.

(10) Patent No.: US 6,674,474 B2
(45) Date of Patent: Jan. 6, 2004

(54) METHOD OF CONTROLLING TRANSMISSION LIGHT AMOUNT AND TELEVISION CAMERA APPARATUS USING THE METHOD

(75) Inventors: Yasuhiko Hatae, Tokyo (JP); Akimi Tsukui, Higashikurume (JP); Yoshifumi Nakamura, Tokorozawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 09/982,165

(22) Filed: Oct. 19, 2001

(65) Prior Publication Data

US 2002/0047909 A1 Apr. 25, 2002

(30) Foreign Application Priority Data

Oct. 23, 2000 (JP) .......................... 2000-322517

(51) Int. Cl.[7] .............................................. H04N 5/238
(52) U.S. Cl. ........................................ 348/363; 348/366
(58) Field of Search ................................ 348/362, 363, 348/364, 221, 366, 344; 349/4, 16

(56) References Cited

U.S. PATENT DOCUMENTS

| | | | | |
|---|---|---|---|---|
| 5,047,850 A | * | 9/1991 | Ishii et al. | ................... 348/699 |
| 5,210,566 A | * | 5/1993 | Nishida | ...................... 354/402 |
| 5,287,177 A | * | 2/1994 | Kim | ............................ 348/169 |
| 5,467,127 A | * | 11/1995 | Jong-Pil | ..................... 348/169 |
| 5,559,555 A | * | 9/1996 | Shimizu et al. | ............. 348/364 |
| 5,589,880 A | * | 12/1996 | Tsukui | ......................... 348/363 |
| 5,963,253 A | * | 10/1999 | Dwyer | ....................... 348/362 |
| 5,995,145 A | * | 11/1999 | Viliesid | ..................... 348/362 |

FOREIGN PATENT DOCUMENTS

| | | | | |
|---|---|---|---|---|
| JP | A-6-52485 | * | 2/1994 | ............ G08G/1/00 |
| JP | A-6-70225 | * | 3/1994 | .......... H04N/5/235 |
| JP | A-9-51484 | * | 2/1997 | .......... H04N/5/335 |

* cited by examiner

*Primary Examiner*—Andrew Christensen
*Assistant Examiner*—Tia M. Harris
(74) *Attorney, Agent, or Firm*—Antonelli, Terry, Stout & Kraus, LLP

(57) ABSTRACT

In a television camera apparatus, while a high luminance level range is detected from a picture signal which is acquired by imaging a moving photographing object by using an image pick-up element or acquired by imaging a subject almost in a static state that enters into a visual field of the image pick-up element by remotely rotating or elevating the image pick-up element, such a range which becomes a high luminance level is predicted based upon a temporal change and the like of this detected range, and such a transmission light amount control is carried out in such a manner that a light amount of imaging light of the predicted range, which is received by a light receiving plane of the image pick-up element, is extincted.

16 Claims, 10 Drawing Sheets

METHOD OF CONTROLLING TRANSMISSION LIGHT AMOUNT AND TELEVISION CAMERA APPARATUS USING THE METHOD

BACKGROUND OF THE INVENTION

The present invention is related to a transmission light amount control method capable of controlling amounts of light which is received on the respective light receiving planes of a large number of photoelectric converting elements arrayed on an image pick-up element of a television camera apparatus, and also related to a television camera apparatus with employment of this transmission light amount control method.

Conventionally, as a means for varying a transmission light amount of incident light in response to a light amount of this incident light, there is such a means using filter glass. This filter glass may vary an extinction amount (a light-attenuation amount) of a transmission light amount by such a manner that while the photochromism phenomenon is utilized, a composition of a portion where light is irradiated is changed in response to a light amount of this irradiated light.

FIG. 1 shows a block structural example of a television camera apparatus using the conventional technique. In this drawing, reference numeral "2'" represents a photochromism filter glass.

Also, other than using the above-explained photochromism phenomenon, there is another camera apparatus using transmission light amount varying means capable of controlling light transmittance every arbitrary pixel, while a liquid crystal filter panel capable of varying light transmittance is arranged on a front surface of a CCD image pick-up element. For instance, such a camera apparatus is disclosed in JP-A-6-70225 and JP-A-9-51484. These two Japanese patent publications describe such an arrangement capable of controlling the light transmittance in correspondence with the pixels, while the liquid crystal panel capable of controlling the light transmittance is employed on the front surface of the image pick-up element.

SUMMARY OF THE INVENTION

In the above-described conventional technique, in such a case that the time period is relatively long, during which after the irradiation of the light is commenced, the extinction amount of the transmission light amount becomes maximum, and further, the moving picture of such a photographing object (a subject) moved in high speed is imaged, since the photochromism phenomenon is utilized, there is such a risk. That is, the transmission light amount control cannot follow the move of the high luminance level range (area) of the photographing object, and therefore, the light of this high luminance level range cannot be extincted.

As the method for adjusting the light transmittance of the liquid crystal panel employed in the camera apparatus described in JP-A-6-70225 (see embodiment modes), in the case that the incident light amount is limited by employing such a liquid crystal panel, first, the preliminary image pick-up operation is carried out, and then, the transmittance of the liquid crystal panel corresponding to such a pixel where the picture data acquired during this preliminary image pick-up operation is "over-exposed" data is controlled so as to be reduced. The main image pick-up operation is carried out under such a condition that this transmittance control is carried out. Then, the over-exposed data of the picture data acquired in this main image pick-up operation can be solved. However, in accordance with this control method, the following initial condition is necessarily required. That is, there is no change in the imaging light originated from the photographing object during at least the preliminary image pick-up operation and the main image pick-up operation. On the other hand, this JP-A-6-70225 does not disclose such as an arrangement capable of solving the over-exposed data problem also occurred in the case that there is a change in the imaging light originated from the photographing object due to the high-speed movement etc. of the photographing object while the preliminary image pick-up operation and the main image pick-up operation are carried out.

Also, as the method for adjusting the light transmittance of the liquid crystal panel employed in the camera apparatus described in JP-A-9-51484 (see embodiment modes), both the high luminance portion is detected, and also, such a feedback control is carried out by repeating the extinction adjustment of the light transmittance of the filter element. Then, as explained in the effects of the invention of this Japanese patent publication, since this feedback control operation is carried out, the extinction adjustment of the light transmittance of the filter element adaptable to the luminance of the high luminance portion can be correctly and easily carried out. However, this conventional adjusting method requires such an initial condition that there is no change in the imaging light originated from the photographing object while the feedback control operation is performed similar to the above adjusting method. On the other hand, this Japanese patent publication does not disclose such an arrangement capable of correctly and easily performing the extinction adjustment of the light transmittance in such a case that the imaging light originated from the photographing object is changed during the feedback control operation.

Also, this Japanese patent publication describes another adjusting method. That is, the light transmittance of the filter element may be controlled by using the inverted signal of the picture signal. However, in this adjusting method, the light transmittance is adjusted by employing such a picture signal just before 1 field period even at the highest timing. As a result, in the case that the imaging light originated from the photographing object is changed during this 1 field period, this publication never discloses such an arrangement capable of correctly and easily performing the extinction adjustment of the light transmittance similar to the above conventional method.

An object of the present invention is to provide a television camera apparatus and also a transmission light amount control method realized in such a television camera apparatus, capable of solving the above-explained problems.

Another object of the present invention is to provide such a television camera apparatus and also a transmission light amount control method employed in a television camera apparatus. That is, while such a control operation is performed so as to extinct a light amount of light of such a range which is predicted based on a temporal change of a high luminance level range, received on a light receiving plane of a photoelectric converting element, a picture signal originated from a moving photographing object portion except for this high luminance level range within the moving photographing object can be more faithfully reproduced.

To solve the above-described problems, a transmission light amount control method of the present invention is featured by that while a high luminance level range is detected from a picture signal which is acquired by imaging a moving photographing object by using an image pick-up element or acquired by imaging a subject almost in a static state that enters into a visual field of the image pick-up element by remotely rotating or elevating the image pick-up element, such a range which becomes a high luminance level is predicted based upon a temporal change and the like of this detected range, and such a transmission light amount control is carried out in such a manner that a light amount of imaging light of the predicted range, which is received by a light receiving plane of the image pick-up element, is extincted.

A television camera apparatus, according to one aspect of the present invention, is featured by such a television camera apparatus for photoelectrically converting incident light originated from a photographing object to acquire a picture signal, comprising:

an image pick-up unit containing a plurality of photoelectric converting elements;

a detection unit for detecting a range of a picture signal having a signal level higher than a predetermined level within the picture signals acquired from the image pick-up unit as a high luminance level range; and a transmission light amount control unit for controlling incident light amounts of the imaging light from the photographing object with respect to the respective photoelectric converting elements every each of the photoelectric converting elements; wherein:

the transmission amount control unit is comprised of:

a change-component detecting unit for detecting a change component between a first high luminance level range which is detected by the detection unit at a first predetermined time instant, and a second high luminance level range which is detected by the detection unit at a second predetermined time instant after the first predetermined time instant; and a control unit of controlling the light amount of the incident light entered into the photoelectric converting elements based upon the first predetermined time instant, the second predetermined time instant, and the detected change-component.

Also, in accordance with an example of the present invention, the transmission light amount control unit is comprised of:

a liquid crystal extinction panel for adjusting the light amounts of the light entered into the photoelectric converting elements; and a liquid crystal drive circuit for controlling transmittance of at least a portion of the incident light with respect to the liquid crystal extinction panel.

Further, in accordance the another example of the present invention, the control unit for controlling the incident light amount with respect to the photoelectric converting elements includes a pattern generating unit; and the pattern generating unit generates a control signal used to the liquid crystal extinction panel based upon the signal derived from the change-component detecting unit.

It should be understood that the above-explained transmission light amount control operation executed in response to the predicted picture signal range may be carried out in such a way that the transmission light amount is extincted based upon at least the same range as this predicted picture signal range, or the incident light entered into the liquid crystal extinction panel 2 is not penetrated therethrough. Alternatively, the transmission light amount control operation may be carried out based upon such a range which contains the predicted picture signal range, and further, is more or less wider than this predicted picture signal range. In this alternative case, even when prediction error is produced, the correct transmission light amount control operation executed based upon this wider range may be expected, since the above-described range of the picture signal having the higher signal level than the predetermined signal level is covered by this wider range.

As described above, in accordance with the present invention, since such a transmission light amount control operation can be carried out in such a manner that the light amount of the imaging light of the range which is predicted by the temporal change of the high luminance level range, which is received by the light receiving plane of the image pick-up element, the picture signal derived from the photographing object other than this high luminance level range can be more faithfully reproduced.

BRIEF DESCRIPTION OF THE DRAWINGS

For a better understanding of the present invention, reference is made of a detailed description in conjunction with the accompanying drawings, in which.

DETAILED DESCRIPTION OF THE EMBODIMENTS

Figure 1:
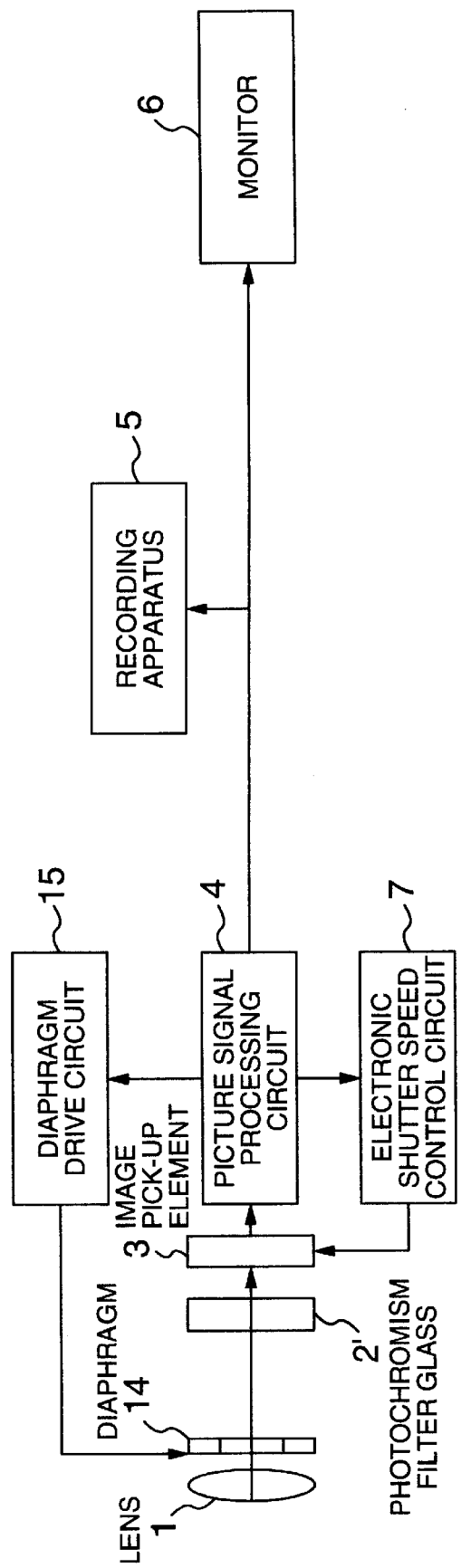
FIG. 1 is a block structural diagram of the television camera apparatus using the conventional technique.
Figure 2:
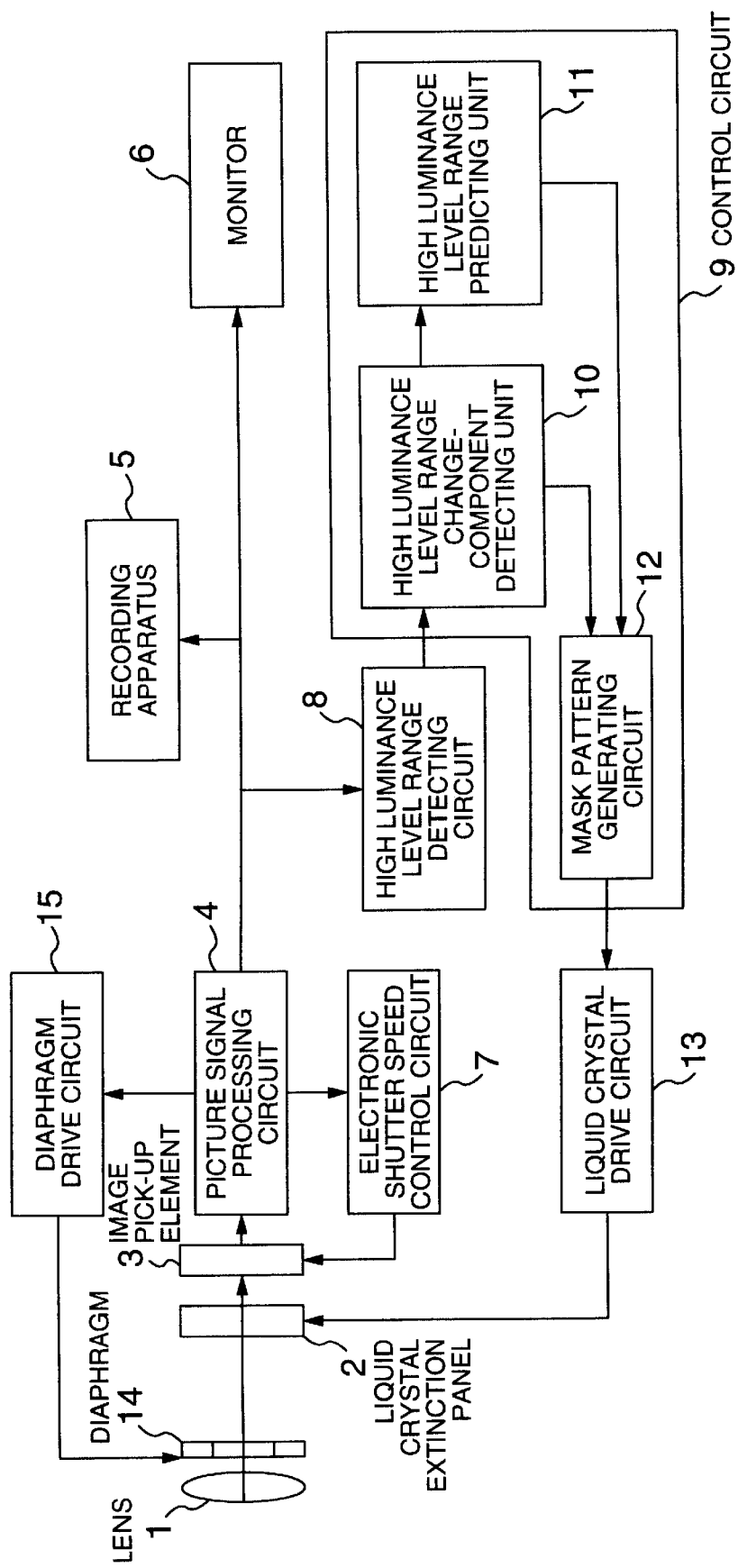
FIG. 2 is a block structural diagram of a television camera apparatus according to a first embodiment of the present invention.

Referring now to drawings, various embodiments of the present invention will be described. FIG. 2 is a block structural diagram of a television camera apparatus according to an embodiment of the present invention. In this drawing, reference numeral 1 shows a lens for collecting imaging light entered from an object to be photographed (photographing object), and light passed through the lens 1 is traveled through a diaphragm 14 and thereafter is shielded, or penetrated by a liquid crystal panel (in this case, will be referred to as a "liquid crystal extinction panel") 2. The light penetrated through the liquid crystal extinction panel 2 is converted into a picture (video) signal by an image pick-up (photographing) element 3. The image pick-up element 3 has a large number of photoelectric converting elements each having a light receiving plane, and the light transmitted through the liquid crystal panel 2 is photoelectrically converted by these photoelectric converting elements, so that the picture signal is acquired. It should be noted that the liquid crystal extinction panel 2 can partially or entirely vary the respective light received in the respective photoelectric converting elements. As a consequence, this liquid crystal extinction panel 2 is configured in a segment arrangement, for example, so that transmission light amounts of imaging light entered into the respective photoelectric converting elements can be varied with respect to each of these photoelectric converting elements.

The picture signal derived from the image pick-up element 3 is entered into a picture signal processing circuit 4 so that a picture signal process operation such as a gamma correction is carried out with respect to this picture signal. Furthermore, the picture signal processing circuit 4 produces a drive signal, or a control signal based upon the entered picture signal, and then outputs these drive signal and control signal to a diaphragm drive circuit 15 and an electronic shutter speed control circuit 7. The diaphragm drive circuit 15 produces such a signal capable of driving the diaphragm 14 based upon the signal supplied from the picture signal processing circuit 4, and then, may drive the diaphragm 14 in response to this produced drive signal. Also, the electronic shutter speed control circuit 7 produces such a signal capable of controlling a shutter speed of an electronic shutter operation by the image pick-up element 3 based upon the signal supplied from the picture signal processing circuit 4, and then, may control the image pick-up element 3 in response to this produced control signal.

A picture signal which has been processed by way of the picture signal processing operation by the picture signal processing circuit 4 and thereafter is outputted from this picture signal processing circuit 4 is recorded on a recording apparatus 5. Alternatively, this processed picture signal is entered into a monitor 6 so as to display thereon an image, or is transmitted to an electronic picture signal appliance (not shown) provided at a post-stage of this television camera apparatus.

In addition, the picture signal outputted from the picture signal processing circuit 4 is inputted to a high luminance level range detecting circuit 8.

In this high luminance level range detecting circuit 8, such a range of a higher luminance signal level than a predetermined level is detected as a "high luminance level range" from the inputted picture signal, and then outputs a detection signal indicative of this detected high luminance level range. This high luminance level range is defined by, for instance, such an imaging range of a head lamp (head light) of an automobile, or a bicycle, which is obtained when this head lamp of either the automobile or the bicycle is turned ON at night, and this turned-ON head lamp is imaged from a substantially front side.

The detection signal outputted from the high luminance level range detecting circuit 8 is entered into a control circuit 9. Such detection signals are entered into the control circuit 9. These detection signals are derived in such a manner that high luminance level ranges are detected from at least two frames of picture signals whose imaging time instants are different from each other. For instance, high luminance level ranges are detected from a picture signal imaged at a first time instant (t1), and also another picture signal imaged at a second time instant (t2) after this first time instant. The control circuit 9 contains a high luminance level range change-component detecting unit 10, a high luminance level range predicting unit 11, and a mask pattern generating circuit 12. First, this high luminance level range change-component detecting unit 10 calculates center coordinate values (X1, Y1), (X2, Y2) of the high luminance level ranges detected from the picture signals imaged at the first time instant (t1) and the second time instant (t2), respectively, then calculates a change amount of a size (dimension), a move amount and a move direction of the high luminance level range between the time instances (t1) and (t2) thereby to obtain a size, a move amount and a move direction of a second high luminance level range detected from the picture signal imaged at the second time instant. Hereinafter, the change amount of the size, the move amount and the move direction etc. of the high luminance level range are generally referred to as a change-component. Incidentally, a high luminance level range detected from the picture signal imaged at the first time instant is referred to as a first high luminance level range. Then, the high luminance level range predicting unit 11 predicts a range of a third high luminance level range from the change-component of the second high luminance level range. That is, the high luminance level range predicting unit 11 predicts by using the method described later the center coordinate values and the size of the third high luminance level range which has a signal level higher than a predetermined signal level among picture signals imaged at a third time instant. Then, the mask pattern generating circuit 12 outputs such a mask pattern generating signal indicative of this predicted range at a time instance before the third time instant by a preselected time.

This mask pattern generating signal is inputted into a liquid crystal drive circuit 13. In response to this inputted mask pattern generating signal, the liquid crystal drive circuit 13 controls the respective segments of the liquid crystal extinction panel 2 thereby to adjust light amounts incident into the respective photoconverting elements of the image pick-up element 3, so that each of the light amounts incident into the respective photoconverting elements within the predicted range is reduced, or shielded. Then, when picture signals are imaged at the above-explained third predetermined time instant of such a time instant at which the liquid crystal extinction panel 2 is driven in the above-explained control manner, imaging light having high luminance levels derived from a photographing object is shielded, or extincted within the predicted range by the control circuit 9 at this imaging time instant.

In this case, the above-explained preselected time is set to such a time duration defined by that after a mask pattern generating signal has been generated, the liquid crystal drive circuit 13 drives the liquid crystal extinction panel 2 in response to this mask pattern generating signal thereby to control transmission light amounts passing through the selected segments of the liquid crystal extinction panel 2.

As a result, in such a case that a high luminance level range is being moved within a screen imaged by the television camera apparatus, for example, when the turned-ON head lamps of an automobile driven at night are imaged from the substantially front side, according to the present invention, both a move position and a move range of this automobile is predicted, and thus, imaging light within the predicted range is shielded, or extincted. As a consequence, while imaging light originated from a photographing object other than this head lamp, for example, imaging light originated from a license plate of the automobile is not shielded, or extincted, an image pick-up operation may be carried out. Further, an image pickup operation may be carried out with a high resolution since the saturation or smear of the image pick-up element caused by incident light originated from the head lamp is hardly generated.

Accordingly, the picture signal process operation, the diaphragm drive control operation, or the electronic shutter speed control operation may be more faithfully carried out with respect to the reception light other than the high luminance level range, so that the picture signal originated from the photographing object other than this high luminance level range may be more faithfully reproduced.

Figure 3:
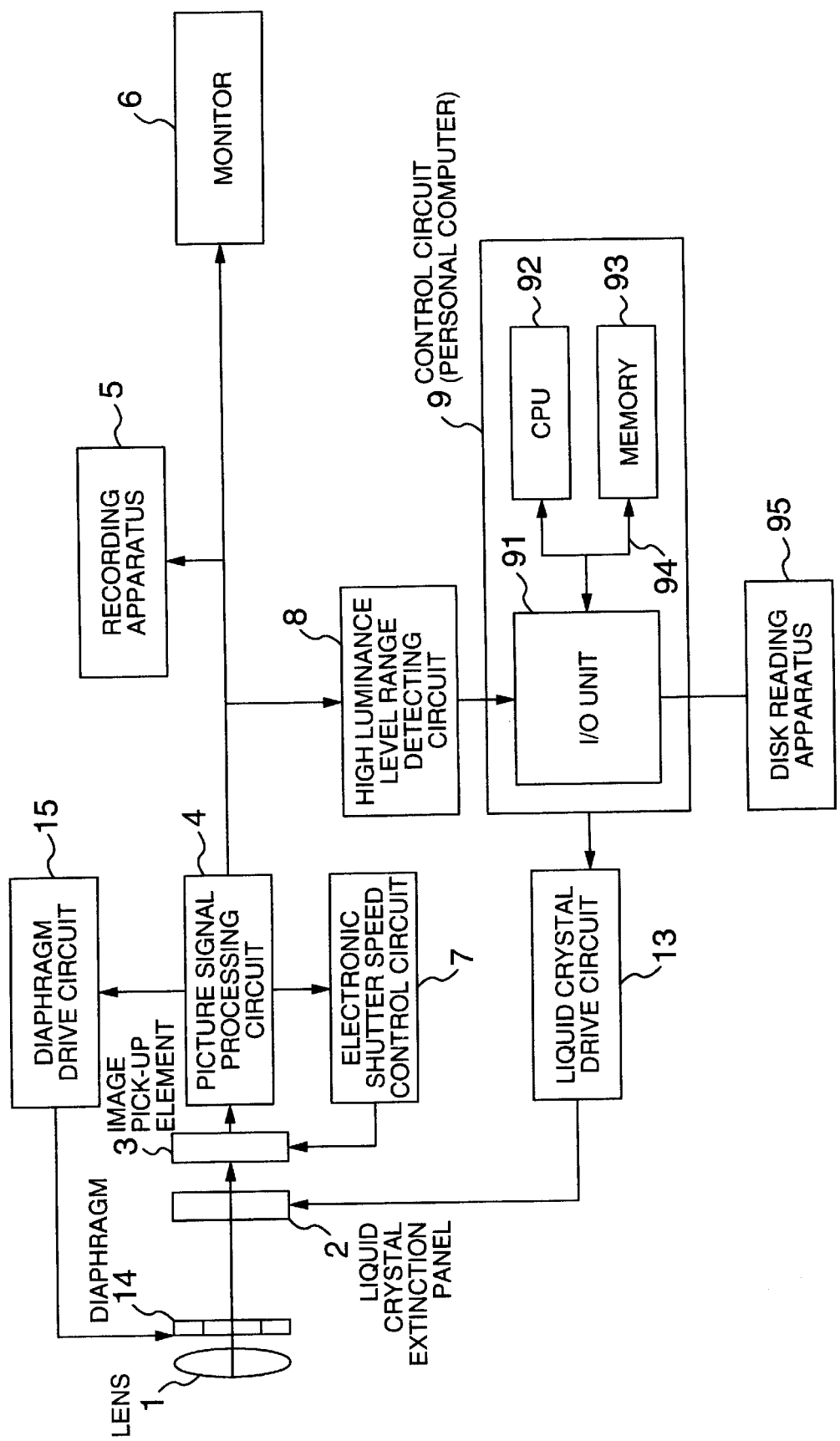
FIG. 3 is a block structural diagram for indicating a modification as to the television camera apparatus according to the first embodiment shown in FIG. 2.

It should be noted that the control circuit 9 may be arranged by a computer. In this alternative case, as indicated in FIG. 3, the control circuit 9 is arranged by an I/O (input/output) unit 91, a CPU 92, a memory (RAM, ROM) 93, and a bus 94 used to connect these devices. Also, both the high luminance level range detecting circuit 8 and the liquid crystal drive circuit 13 are connected to the I/O unit 91. As a consequence, the operations of the control circuit 9 (namely, high luminance level range change-component detecting unit 10, the high luminance level range predicting unit 11, and also mask pattern generating circuit 12) may be realized in accordance with a program stored in the ROM. Also, in this alternative case, the mask pattern generating circuit 12 may be constituted by hardware.

Figure 9:
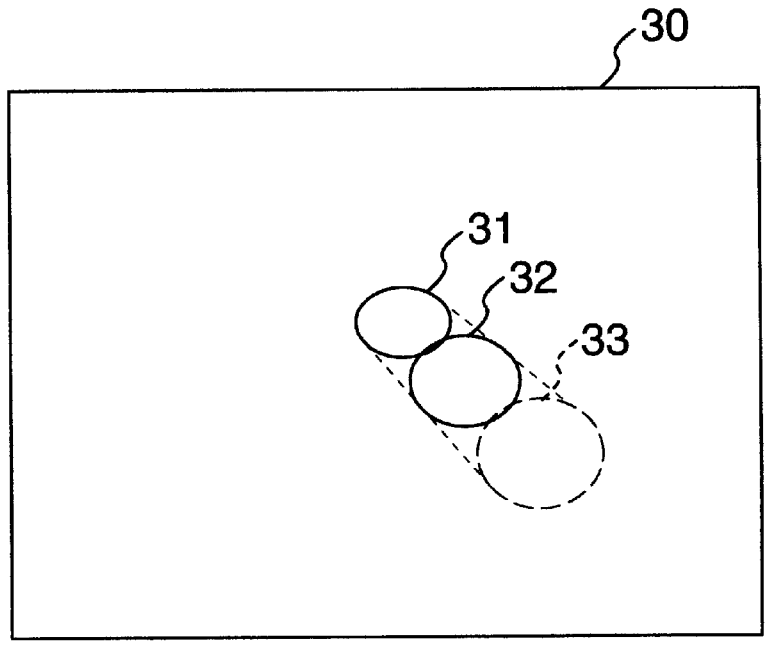
FIG. 9 is a diagram for illustratively showing an example of an image screen imaged by the television camera apparatus of the present invention.

Referring now to flow charts of FIG. 6 and FIG. 9 for explaining flow operations, a description will be made of a transmission light amount control method according to the present invention.

Figure 6:
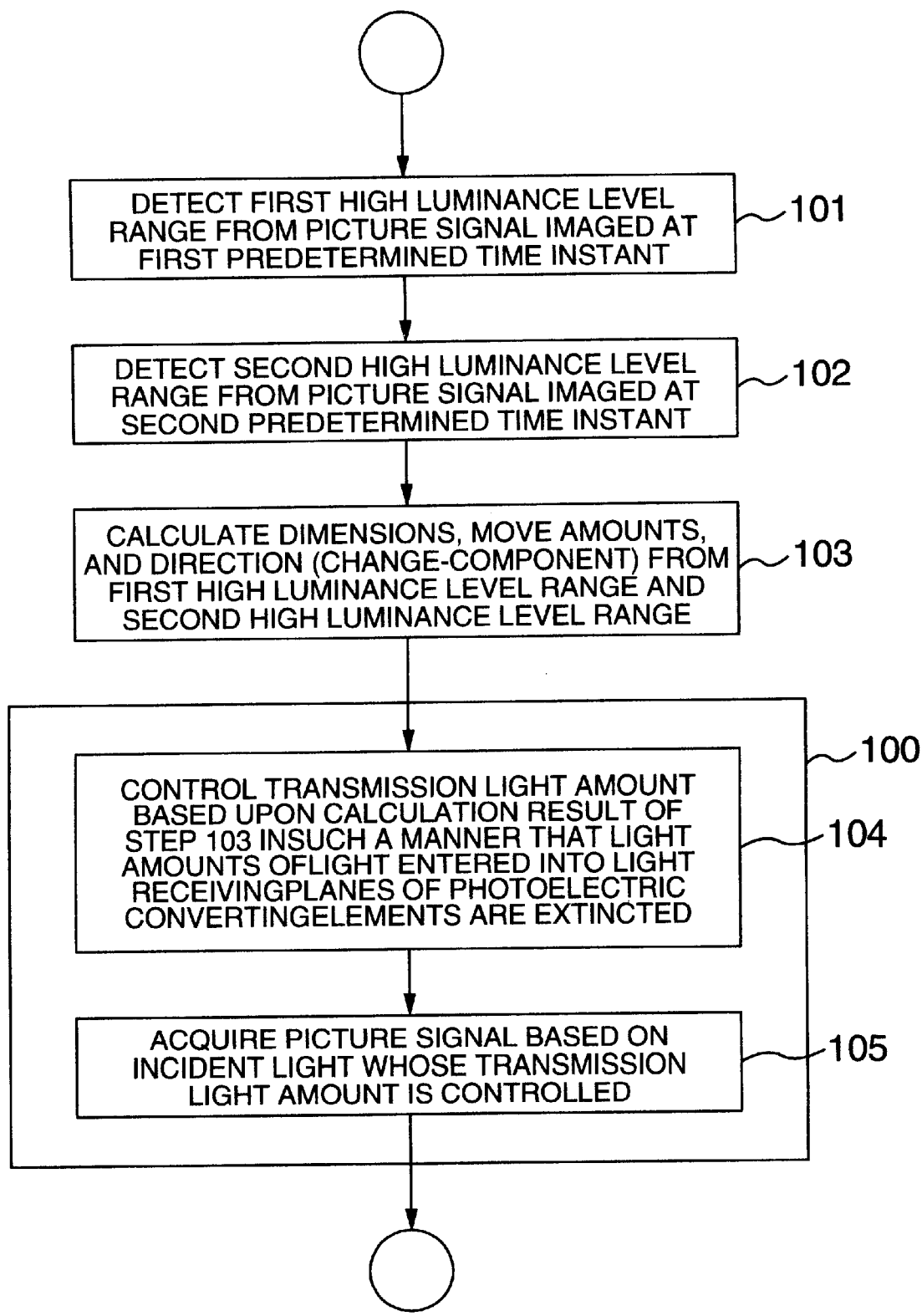
FIG. 6 is a flow chart for describing a sequential operation example of a transmission light amount control method according to a first embodiment of the present invention.

In the flow chart of FIG. 6, first, the high luminance level range detecting circuit 8 detects a first high luminance level range from a picture signal imaged at a first predetermined time instant (step 101). Next, this high luminance level range detecting circuit 8 detects a second high luminance level range from a picture signal imaged at a second predetermined time instant (step 102).

Then, the high luminance level range change-component detecting unit 10 calculates a size, a move amount and a move direction of the second high luminance level range from the detected first high luminance level range and the detected second high luminance level range (step 103). Then, both the high luminance level range predicting unit 11 and the mask pattern generating circuit 12 predict a size and center coordinate values of the third high luminance level range which is imaged at a third predetermined time instant after a predetermined time period has passed from the second time instant, based upon the change-component. Thereafter, the control circuit 9 controls incident light amounts incident into the photoconverting elements of the image pick-up element 3 in such a manner that amounts of light incident into the photoelectric converting elements corresponding to the center coordinate values and the size of the third high luminance level range are extincted at the third predetermined time instant (step 104). In this manner, the television camera apparatus acquires such a picture signal in response to the reception light, the transmission light amount of which is controlled (step 105).

In this case, a positional relationship of an imaged high luminance level range will now be explained with reference to FIG. 9 and FIG. 10, which represent schematic diagrams of imaging screens imaged by the television camera apparatus of the present invention. In the drawings, reference numeral 30 shows a screen frame of an imaging screen. A first high luminance level range 31 imaged at the first predetermined time instant t1 is detected with respect to this screen frame 30. Furthermore, a second high luminance level range 32 imaged at the second predetermined time instant t2 is detected at, for example, such a position which is moved from the first high luminance level range 31 along an oblique and lower right direction. As a consequence, the change amount of the size and the move value of the center coordinate of the second high luminance level range 32 is obtained based on the sizes and the positional relations between the first high luminance level range 31 and the second high luminance level range 32. Furthermore, the control circuit 9 can predict the third high luminance level range 33 to be photographed at the third time instant t3 when a predetermined time period has passed after the second time instant t2, at such a position which is further moved from the second high luminance level range 32 along the oblique and lower right direction, based upon the first predetermined time instant t1 and the second predetermined time instant t2. Thus, the control circuit 9 controls the liquid crystal extinction panel 2 in such a manner that amounts of light incident into the photoelectric converting elements corresponding to the third high luminance level range are extincted at the third predetermined time instant t3.

An example of this prediction operation will now be described more in detail with reference to FIG. 10.

Figure 10:
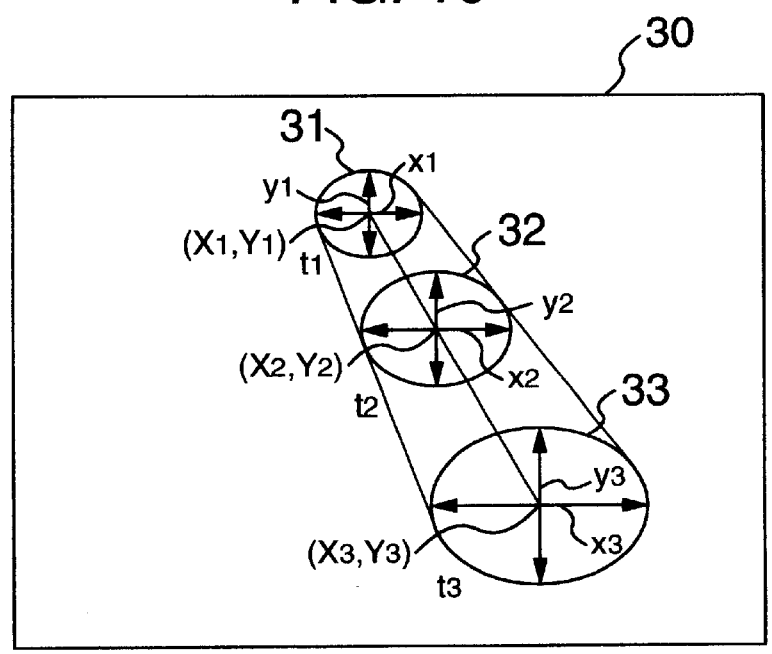
FIG. 10 is a diagram for illustratively representing one example of an image screen imaged by the television camera apparatus of the present invention so as to explain one prediction method of a high luminance level image.

The prediction operation example indicated in FIG. 10 is the simplest prediction method in such a case that a high luminance level range is moved in a linear fashion at a constant speed.

In FIG. 10, such an assumption is made as follows: That is, while center coordinate values of the first high luminance level range 31 are defined as "X1" and "Y1", a length thereof along an X direction (for example, corresponding to horizontal scanning direction) is defined as "x1", and also a length thereof along a Y direction (for instance, corresponding to vertical scanning direction) is defined as "y1"; and center coordinate values of the second high luminance level range 32 are defined as "X2" and "Y2", a length thereof along the X direction is defined as "x2", and also, a length thereof along the Y direction is defined as "y2"; it is so assumed that center coordinate values of the predicted third high luminance level range 33 are defined as "X3" and "Y3", a length thereof along the X direction is defined as "x3", and also, a length thereof along the Y direction is defined as "y3." Since the high luminance level range is moved in the linear manner at the constant speed, the center coordinate values (X3, Y3) of the third high luminance level range 33, and the lengths (x3, y3) thereof along the X direction and the Y direction may be predicted based on values which are calculated by the below-mentioned expressions (1) to (4):

$$X3=X2+(X2-X1)(t3-t2)/(t2-t1) \quad (1)$$

$$Y3=Y2+(Y2-Y1)(t3-t2)/(t2-t1) \quad (2)$$

$$x3=x2+(x2-x1)(t3-t2)/(t2-t1) \quad (3)$$

$$y3=y2+(y2-y1)(t2-t2)/(t2-t1) \quad (4)$$

It should be noted that as to the above-explained expressions (3) and (4) used to calculate the lengths (x3, y3) of this third high luminance level range 33, since these lengths are approximately calculated in this example, such expressions (3) and (4) similar to the above-described expressions (1)

and (2) are employed. Alternatively, in order to more precisely predict these values, such an expression may be employed. That is, this expression is established by considering trigonometric functions in correspondence with an imaging direction, and a move direction of a high luminance level range.

Next, a more detailed description will now be made of a step 100 which is constituted by the above-explained steps 104 and 105 with reference to FIG. 7.

Figure 7:
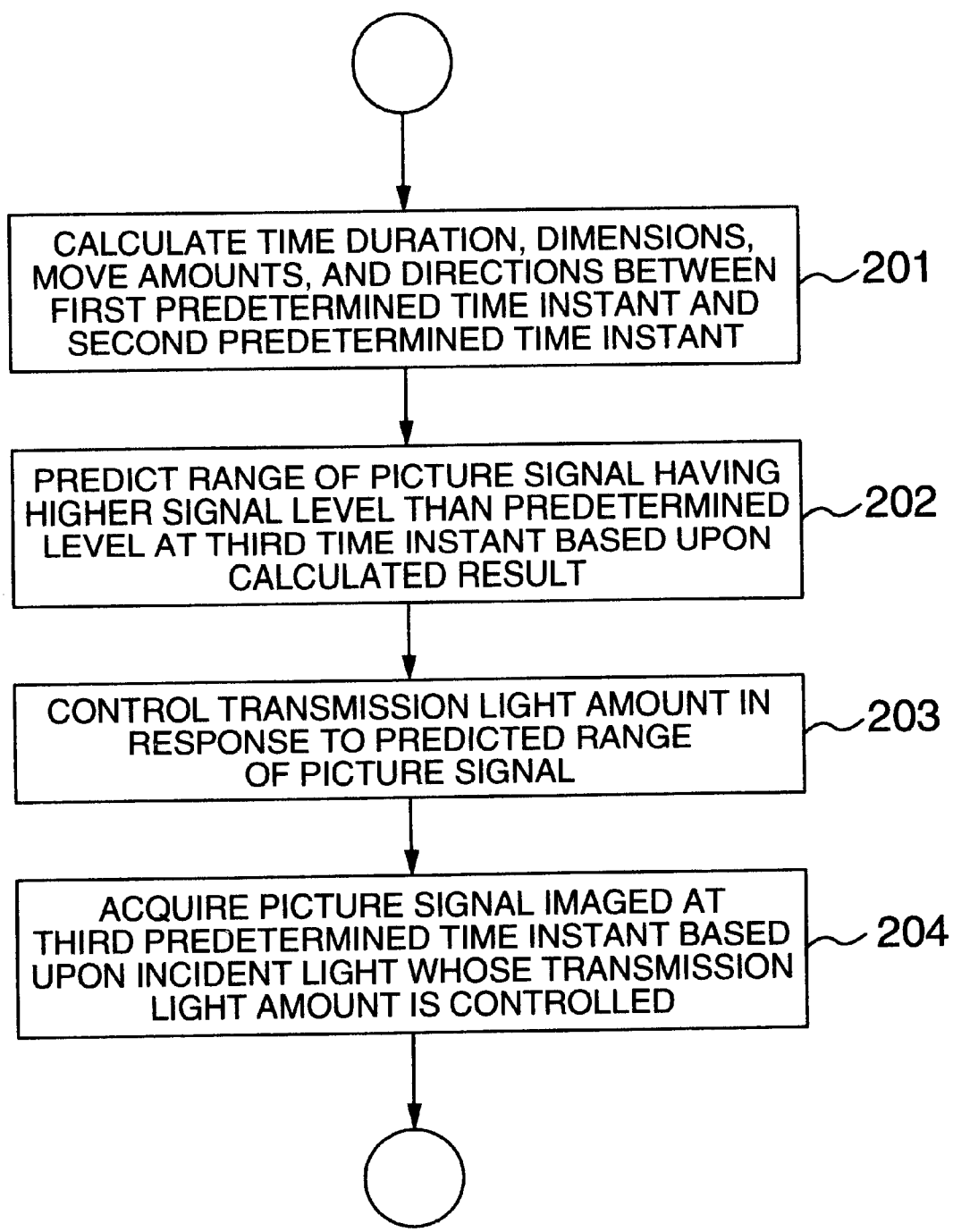
FIG. 7 is a flow chart for describing in detail one example of a process operation defined at a step 100 of FIG. 6.

That is, FIG. 7 is a flow chart for describing one example of a sequential operation defined at the step 100 in more detail. In this flow chart, the high luminance level range change-component detecting unit 10 first calculates a time duration (t2−t1) between the first predetermined time instant "t1" and the second predetermined time instant "t2", and furthermore, calculates a change-component (a change amount of the size, a move amount and a move direction etc.) between the first high luminance level range 31 and the second high luminance level range 32 (step 201). In other words, this high luminance level range change-component detecting unit 10 calculates move amounts (X2−X1) and (Y2−Y1) of the center coordinate values of the first and second high luminance level ranges 31 and 32, and also calculates change amounts (x2−x1) and (y2−y1) of the lengths thereof along both the X direction and the Y direction. Next, based upon the above-calculated time duration and also the above-explained results calculated at the previous step 103, the high luminance level range predicting unit 11 predicts such a range (namely, range 33 shown in FIG. 9) of a picture signal having a signal level higher than a predetermined level at the third predetermined time instant t3 in accordance with the above-explained expressions (1) to (4) (step 202). Then, the mask pattern generating circuit 12 outputs such a mask pattern generating signal indicative of this predicted range before the third predetermined time instant t3 by the preselected time duration, and then, the control circuit 9 controls the transmission light amount of the selected segments (selected range) of the liquid crystal extinction panel 2 in response to the third high luminance level range (step 203). Then, the television camera apparatus obtains a picture signal by the incident light to which the transmission light amount control has been performed at the third 11.

Figure 8:
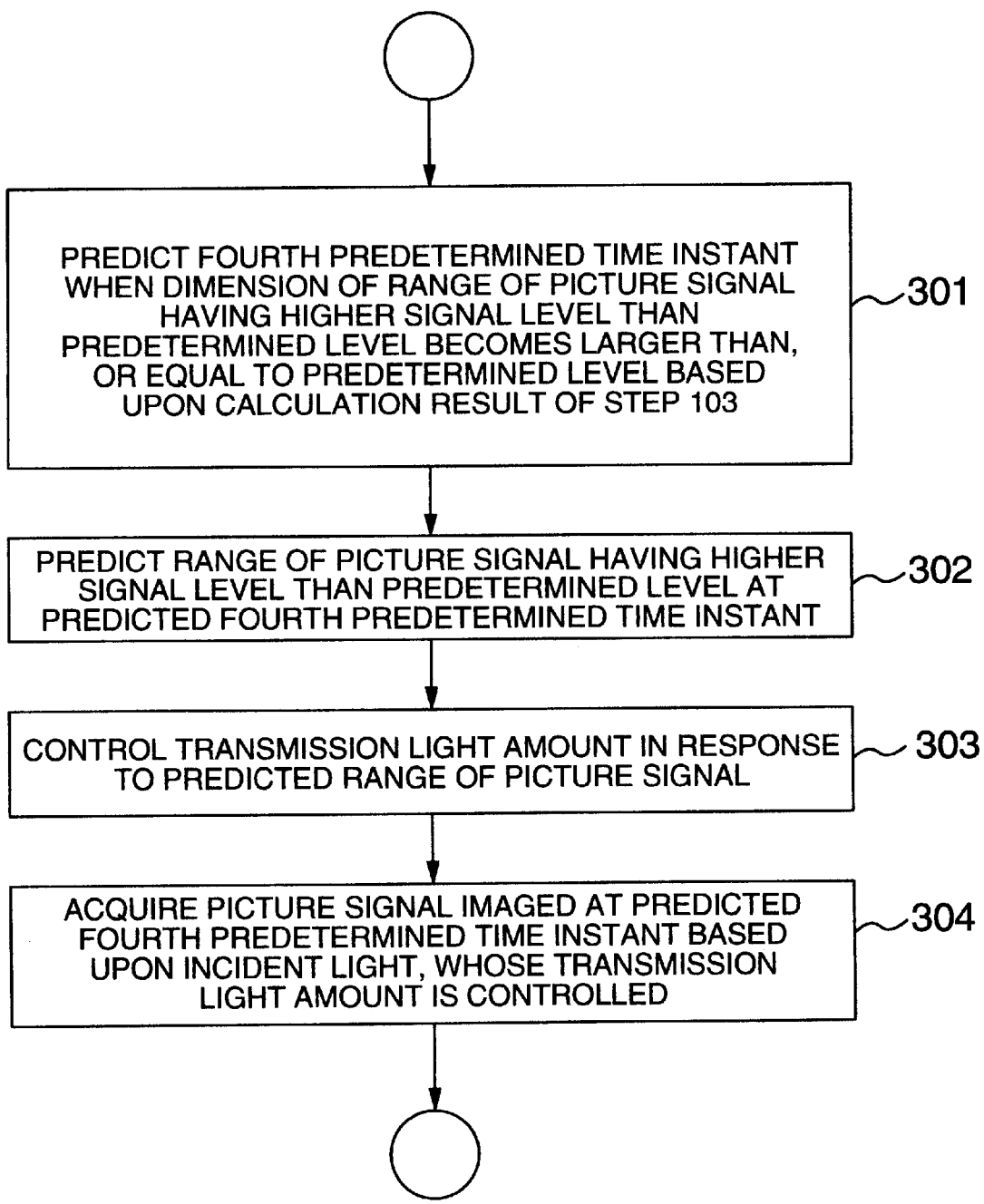
FIG. 8 is a flow chart for explaining in detail another example of a process operation defined at the step 100 shown in FIG. 6.

Similarly, FIG. 8 is a flow chart for explaining more in detail another example of the sequential operation defined at the step 100. First, in this flow chart, the high luminance level range predicting unit 11 predicts a fourth predetermined time instant based upon the first predetermined time instant, the second predetermined time instant, and also the results calculated at the above-described step 103 (step 301). At this fourth predetermined time instant, the dimension (size) of the range of the high luminance level having the higher signal level than the predetermined level becomes larger than, or equal to a predetermined dimension. That is, at this fourth predetermined time instant t4, values "x4" and "y4" of a fourth high luminance level range 34 indicated in FIG. 11 become larger than, or equal to predetermined values "xp" and "yp", respectively. The high luminance level range predicting unit 11 predicts the position (center coordinate), size and move direction (namely range 33 shown in FIG. 9 and FIG. 10) of a picture signal having a higher signal level than a predetermined level at the fourth predetermined time instant t4 predicted at the previous step 301 (step 302). Then, the mask pattern generating circuit 12 outputs such a mask pattern generating signal indicative of this predicted range before the fourth predetermined time instant t4 by the preselected time duration, and then, the control circuit 9 controls the transmission light amount of the liquid crystal extinction panel 2 in response to the position (center coordinate), size and move direction of this predicted range (step 303). Then, the television camera apparatus obtains a picture signal by the incident light to which the transmission light amount control has been performed at the fourth predetermined time instant t4 (step 304).

Figure 11:
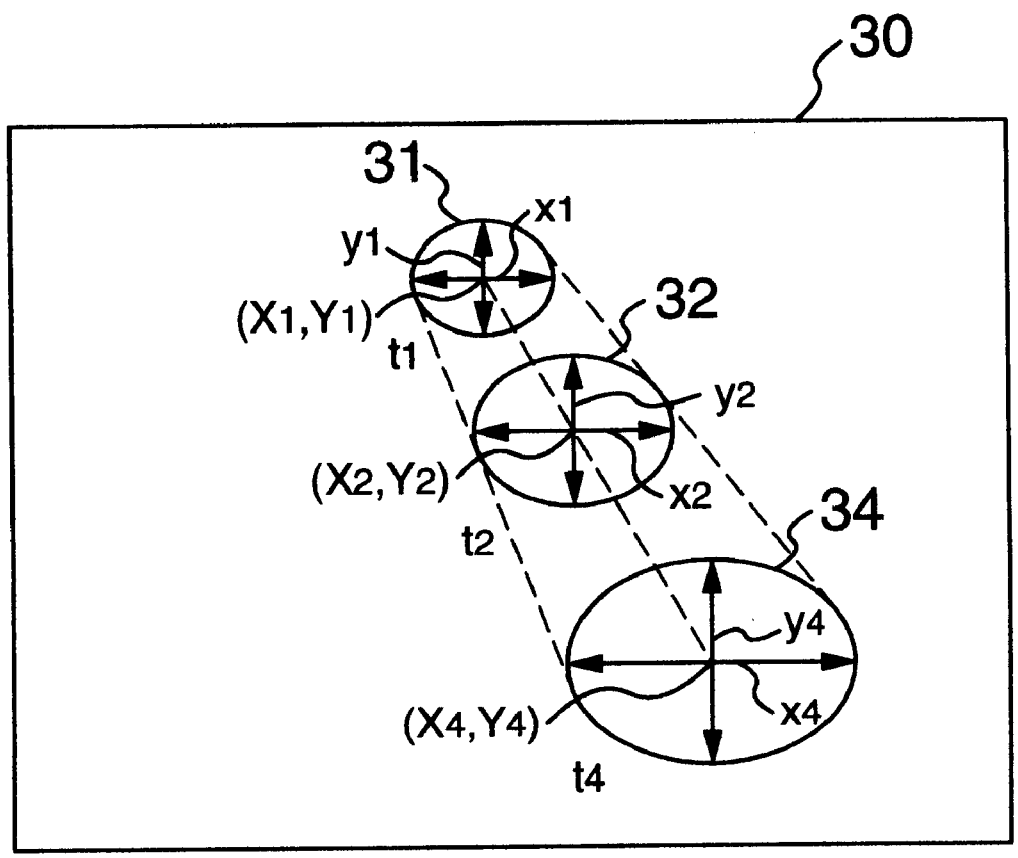
FIG. 11 is a diagram for illustratively representing another example of an image screen imaged by the television camera apparatus of the present invention so as to explain another prediction method of a high luminance level image.

In this case, as shown in FIG. 11, while the predicted fourth predetermined time instant is assumed as "t4", it is so assumed that center coordinate values of the fourth high luminance level range 34 are equal to (X4, Y4), and lengths thereof along the X direction and the Y direction are equal to (x4, y4), respectively. Assuming now that the high luminance level range is moved in the linear mode at a constant speed, the fourth predetermined time instant t4, and also the center coordinate values of the fourth high luminance level range 34 may be calculated or predicted based upon the below-mentioned expressions (5) to (7):

$$t4=(x4-x2)(t2-t1)/(x2-x1)+t2, \text{ otherwise}$$

$$t4=(y4-y2)(t2-t1)/(y2-y1)+t2 \quad (5)$$

$$X4=X2+(X2-X1)(t3-t2)/(t2-t1) \quad (6)$$

$$Y4=Y2+(Y2-Y1)(t3-t2)/(t2-t1) \quad (7)$$

It should be noted that the fourth predetermined time instant t4 is calculated approximately in this embodiment by using the expression (5).

It should also be noted that the time period used to detect the high luminance level range may be selected to be constant time. Also, in the above explanation, such a prediction method has been described in the case that the high luminance level range is moved in the linear manner at the constant speed. Alternatively, the present invention may be applied to such a case that the high luminance level range is moved in a nonlinear manner, and/or is moved in a variable speed. When the high luminance level range is moved in the nonlinear manner, the prediction may be carried out by considering a change in the move directions of the high luminance level range. Also, when the high luminance level range is moved at the variable speeds, the prediction may be carried out by considering a change in the speeds of the high luminance level range. In such alternative cases, a position, a dimension, and a move direction of such a high luminance level range may be predicted based upon the high luminance level ranges at least at the first time instant, the second time instant, and the third time instant.

Incidentally, the prediction method of the high luminance level range is not limited to the aforesaid method, and the present invention may employ any known prediction method.

On the other hand, the above-described JP-A-6-52485 describes the technique capable of calculating the position of the vehicle which is predicted after a predetermined time duration has passed. However, this Japanese patent publication does not describe such a technique capable of predicting a dimension of this vehicle.

It should also be noted that the above-explained transmission light amount control method may be realized as follows: That is, while the above-explained respective sequential operations are expressed by a computer executable program code, and also, this computer executable program code is recorded on a recording medium (for example, CD-ROM, CD-R, DVD etc.), this program code may be read out from the recording medium by a disk readout apparatus 95 which is connected to a computer apparatus corresponding to the control circuit 9 shown in FIG. 3.

Figure 4:
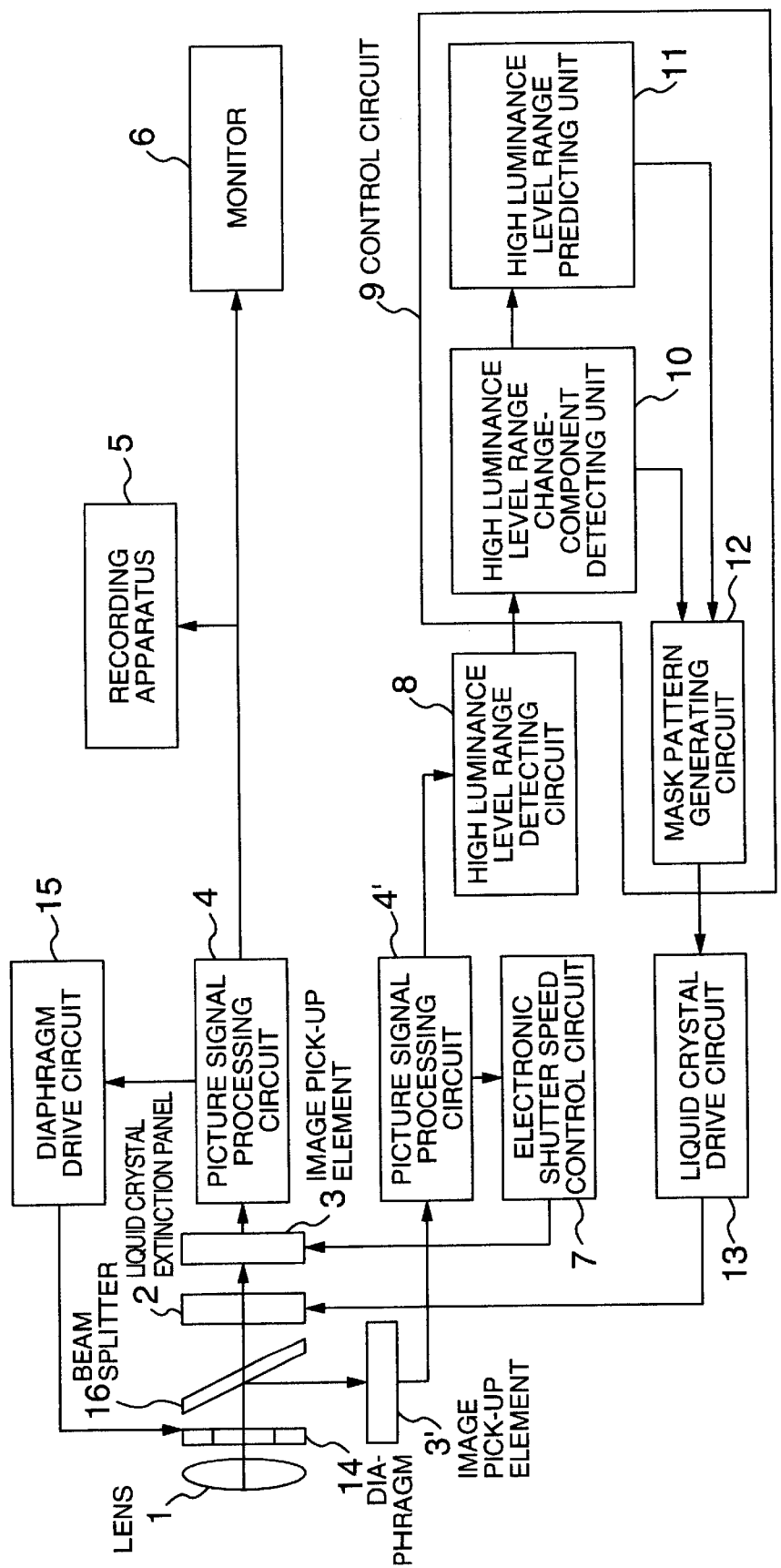
FIG. 4 is a block structural diagram of a television camera apparatus according to a second embodiment of the present invention.

Next, a description will now be made of a television camera apparatus according to a second embodiment of the present invention, while employing FIG. 4 for representing a block structural diagram of this television camera apparatus. In this drawing, the structure of this television camera apparatus is different from that of FIG. 2 as follows: That is, a beam splitter 16, an image pick-up element 3', and a picture signal processing circuit 4' are newly provided. This beam splitter 16 functions as a light splitting (spectroscope) unit for splitting imaging light which passes through the diaphragm 14 into two sets of light, and is provided between this diaphragm 14 and the liquid crystal extinction panel 2. One of the split imaging light from the beam splitter 16 is entered through the liquid crystal extinction panel 2 into the image pick-up element 3, whereas the other of the split imaging light from the beam splitter 16 is entered into the image pick-up element 3'.

Then, such a picture signal which has been imaged by the image pick-up element 3 and then has been processed by the picture signal processing circuit 4 is recorded on the recording apparatus 5, or is inputted into the monitor 6 so as to display thereon an image of this picture signal. Alternatively, this processed picture signal is transmitted to an electronic picture appliance provided at a post-stage of this television camera apparatus. Also, such a picture which has been imaged by the image pick-up element 3' and then has been processed by the picture signal processing circuit 4' is inputted to the high luminance level detecting circuit 8. Based upon this picture signal inputted into the high luminance level range detecting circuit 8, a range of a picture signal having a larger signal level than a predetermined signal level is predicted among picture signals which are imaged when a predetermined time period has passed after the second time instant in a similar manner to the above-explained operation, and a mask pattern generating signal indicative of this predicted range is outputted from the control circuit 9.

It should be understood that among the two sets of the above-described light split by the beam splitter 16, such split light having a smaller split light amount may be entered into the image pick-up element 3', whereas split light having a larger split light amount may be entered into the image pick-up element 3. With employment of such an alternative arrangement, even when the split light having the smaller split light amount is used so as to detect the high luminance level range, since the contrast may be especially emphasized, there is no problem in detecting of this high luminance level range. Also, the picture signal which is imaged by the image pick-up element 3 may be outputted to a post-staged circuit as such a picture signal having a wider dynamic range.

Figure 5:
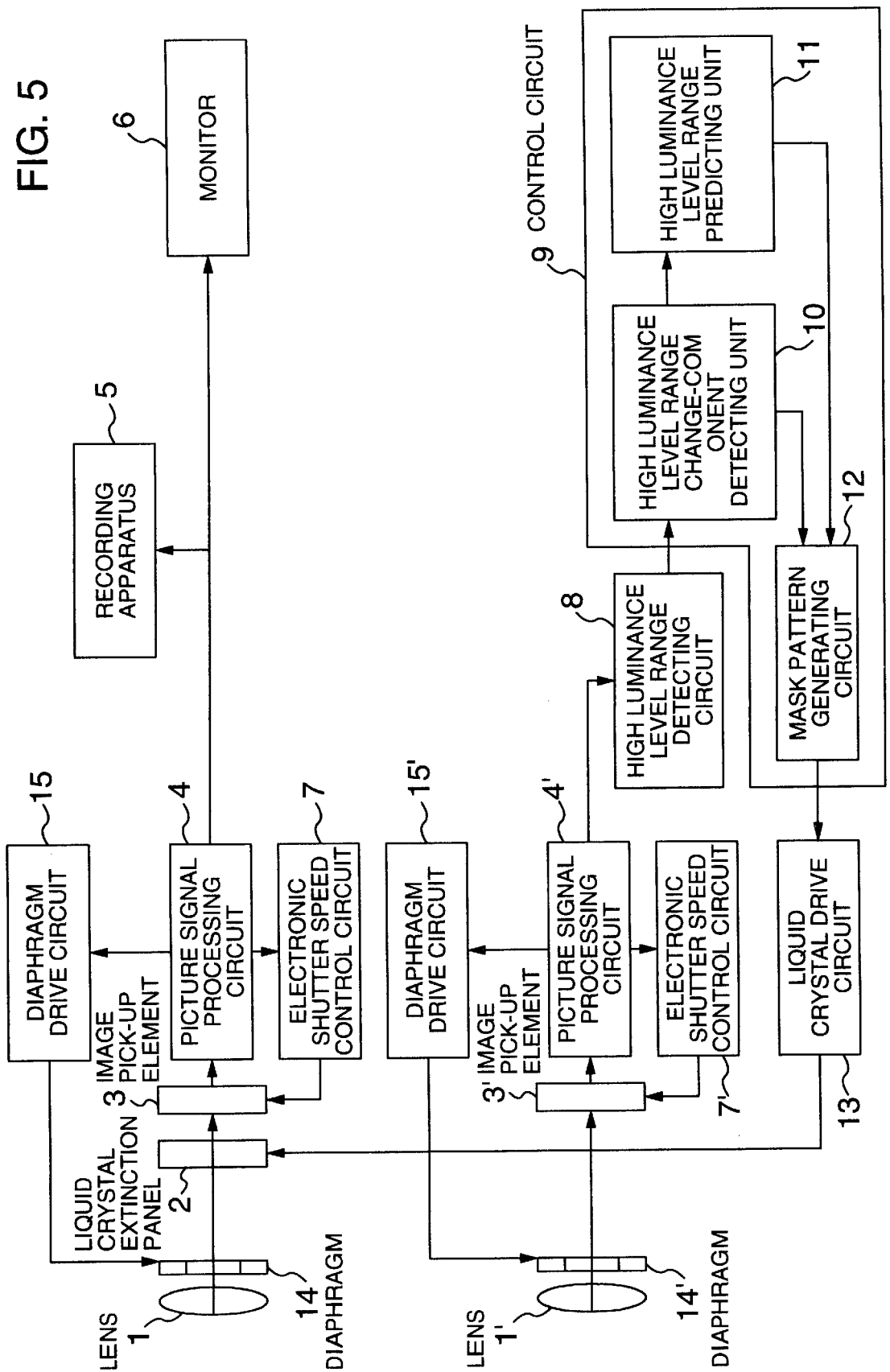
FIG. 5 is a block structural diagram of a television camera apparatus according to a third embodiment of the present invention.

Next, a description will now be made of a television camera apparatus according to a third embodiment of the present invention, while employing FIG. 5 for representing a block structural diagram of this television camera apparatus. In this drawing, the structure of this television camera apparatus is different from that of FIG. 4 as follows: A lens 1', a diaphragm 14', and a diaphragm drive circuit 15' are employed and correspond to an optical image pick-up apparatus capable of entering imaging light used by the image pick-up element 3', while the beam splitter 16 for splitting the imaging light is not provided. With employment of the above-explained arrangement, both the optical image pick-up apparatus used to enter the imaging light of the image pick-up element 3, and the optical image pick-up apparatus used to enter the imaging light of the image pick-up element 3' can be separately provided. The optical axis directions, the diaphragm stops, the focal distance adjustments, the zooming magnification, and the like of these optical elements can be set to their optimum values so as to detect the high luminance level ranges, and also to output the picture signal originated from the photographing object other than the high luminance level range.

As previously described in detail, in accordance with the present invention, since the light of such a range which is predicted based upon the temporal change of the high luminance level range can be controlled in such a manner that the light amount of this light received by the light receiving plane is extracted, the picture signals originated from the photographing object except for the high luminance level range thereof can be more faithfully reproduced.

What is claimed is:

1. A television camera apparatus for converting an incident light originated from a photographing object into a picture signal, comprising:

an image pick-up unit containing a plurality of photoelectric converting elements, for generating said picture signal;

a detection unit for detecting first and second luminance level ranges each higher than a predetermined level within said picture signal at first and second predetermined time instants, respectively, and detecting a change component between said first and second luminance level ranges;

a transmission light amount control unit for controlling a light amount of said incident light from said photographing object, received on the respective photoelectric converting elements;

a predicting unit for predicting, at a preselected time instant before a third predetermined time instant, a third luminance level range at said third predetermined time instance higher than the predetermined level from said picture signal based on said change component from said detection unit; and a control unit coupled with said transmission light amount control unit, for controlling a light amount of said incident light entered into said photoelectric converting elements at said third predetermined time instant, based upon an output of said predicting unit.

2. A television camera apparatus according to claim 1 wherein:

said transmission light amount control unit comprises:
a liquid crystal extinction panel for adjusting a light amount of said incident light entered into said photoelectric converting elements; and
a liquid crystal drive circuit for controlling said liquid crystal extinction panel in response to said control unit.

3. A television camera apparatus according to claim 2 wherein:

said liquid crystal extinction panel is constituted by a large number of liquid crystal segments.

4. A television camera apparatus according to claim 2 wherein:

said control unit further comprises a pattern generating unit; and
said pattern generating unit generates a mask pattern signal in response to said third luminance level range in order to control said liquid crystal extinction panel.

5. A television camera apparatus according to claim 1 wherein:

said transmission light amount control unit includes a high luminance level range predicting unit; and said high luminance level range predicting unit predicts a third high luminance level range from said object based upon the detection signal derived from said change-component detecting unit at a third predetermined time instant after said second predetermined time instant, and controls the light amounts of the incident light originated from said object at said third predetermined time instant.

6. A television camera apparatus according to claim 1 wherein:

said transmission light amount control unit predicts a fourth predetermined time instant based upon said first predetermined time instant, said second predetermined time instant, and said detected change component, within such a high luminance level range higher than said predetermined level, in which a dimension of said range is larger than, or equal to a predetermined dimension; and controls the light amounts of said incident light at said fourth predetermined time instant.

7. A television camera apparatus having a first image pick-up element and a second image pick-up element for converting an incident light entered from an object, comprising:

first and second image pick-up units, each of which has a plurality of photoelectric converting elements, for generating said picture signal;

a detection unit for detecting first and second luminance level ranges each higher than a predetermined level within said picture signal at first and second predetermined time instants, respectively, and detecting a change component between said first and second luminance level ranges;

a transmission light amount control unit for controlling light amounts of said incident light with respect to the respective photoelectric converting elements of said second image pick-up unit;

a predicting unit for predicting, at a preselected time instant before a third predetermined time instant, a third luminance level range at said third predetermined time instance higher than the predetermined level from said picture signal based on said change component from said detection unit; and a control unit coupled with said transmission light amount control unit, for controlling a light amount of said light entered into the light receiving plane of the photoelectric converting elements of said second image pick-up unit at a preselected time instant before at said third predetermined time instant, based upon an output of said predicting unit.

8. A television camera apparatus according to claim 7, further comprising:

a light splitting unit for splitting an imaging light entered from said object into two sets of imaging lights; wherein:

one of said imaging lights is entered into said first image pick-up unit, and the other one is entered into said second image pick-up unit.

9. A television camera apparatus according to claim 8 wherein:

in the case that light amounts of said two split imaging lights are different from each other, the split imaging light having a smaller split light amount among said two split imaging lights is entered into said first image pick-up unit, and the split imaging light having a larger split light amount is entered into said second image pick-up unit.

10. A television camera apparatus according to claim 7, further comprising:

a first optical image pick-up unit and a second optical image pick-up unit, which are used to photograph the imaging light entered from said object, are provided with said first image pick-up unit and said second image pick-up unit.

11. A transmission light amount control method used for a television camera apparatus having an image pick-up element and for acquiring a picture signal in such a manner that imaging light which is entered from an object is received by light receiving planes of a large number of photoelectric converting elements arrayed on said image pick-up element, and the imaging light received in the respective photoelectric converting elements is converted into said picture signal, comprising:

a step (a) in which a picture signal range having a higher signal level than a predetermined level within a picture signal imaged at a first predetermined time instant is detected as a first high luminance level range, and a picture signal range having a higher signal level than said predetermined level is detected as a second high luminance level range within a picture signal imaged at a second predetermined time instant;

a step (b) in which a change-component between said first high luminance level range and said second high luminance level range is detected;

a step (c) in which a third luminance level range at a third predetermined time instant, having a higher signal level than a predetermined level from said picture signal is predicted at a preselected time instant before said third predetermined time instant based on said change component; and a step (d) in which the amount of said imaging light is controlled at said third predetermined time instant in response to a predicted third luminance level range.

12. A transmission light amount control method according to claim 11 wherein:

said step (b) further calculates a time duration between said first predetermined time instant and said second predetermined time instant; and said step (d) further predicts a range of a picture signal having a signal level higher than said predetermined level, which is imaged at a third predetermined time instant after said second predetermined time instant, in correspondence with said calculated time duration and said detected change-component; and controls the transmission light amount of said transmission light amount varying unit at said third predetermined time instant in response to said predicted picture signal range.

13. A transmission light amount control method according to claim 11 wherein:

said step (d) further predicts a fourth predetermined time instant after said second predetermined time instant based upon said first predetermined time instant, said second predetermined time instant, and said detected change-component, at which the range of the picture signal having the signal level higher than said predetermined level is imaged, and a dimension of said range is larger than, or equal to a predetermined dimension; and predicts said range of the picture signal having the signal level higher than said predetermined level at said predicted fourth predetermined time instant; and controls the transmission light amount of said transmission light amount varying unit at said third predetermined time instant in response to said predicted picture signal range.

14. A computer readable storage medium recording thereon program codes capable of being executed by a computer wherein:

said program codes perform:
- a step in which imaging light entered from an object is received by light receiving planes of a large number of photoelectric converting elements arrayed on an image pick-up element, and the imaging light received by the respective photoelectric converting elements is photoelectrically converted so as to acquire picture signals;
- a step in which a picture signal range having a higher signal level than a predetermined level within a picture signal imaged at a first predetermined time instant is detected as a first high luminance level range among said acquired picture signals, and also a picture signal range having a higher signal level than said predetermined level is detected as a second high luminance level range within a picture signal imaged at a second predetermined time instant;
- a step in which a change-component between said first high luminance level range and said second high luminance level range is acquired;
- a step in which a third luminance level range at a third predetermined time instant, having a higher signal level than a predetermined level from said picture signal is predicted at a preselected time instant before said third predetermined time instant based on said change component; and
- a step in which said transmission light amount is controlled at said third predetermined time instant in response to a predicted third luminance level range.

15. A television camera apparatus for photoelectrically converting incident light originated from a photographing object to acquire a picture signal, comprising:
- an image pick-up unit containing a plurality of photoelectric converting elements;
- a detection unit for detecting a range of a picture signal having a signal level higher than a predetermined level within said picture signals acquired from said image pick-up unit as a high luminance level range; and
- a transmission light amount control unit for controlling incident light amounts of said imaging light from the photographing object with respect to the respective photoelectric converting elements every each of said photoelectric converting elements; wherein:
  said transmission amount control unit comprises:
  - a change-component detecting unit for detecting a change component between a first high luminance level range which is detected by said detection unit at a first predetermined time instant, and a second high luminance level range which is detected by said detection unit at a second predetermined time instant after said first predetermined time instant; and
  - a control unit of controlling the light amount of the incident light entered into said photoelectric converting elements based upon said first predetermined time instant, said second predetermined time instant, and said detected change-component, wherein
    said transmission light amount control unit predicts a fourth predetermined time instant based upon said first predetermined time instant, said second predetermined time instant, and said detected change component, within such a high luminance level range higher than said predetermined level, in which a dimension of said range is larger than, or equal to a predetermined dimension; and controls the light amounts of said incident light at said fourth predetermined time instant.

16. A transmission light amount control method used for a television camera apparatus having an image pick-up element and for acquiring a picture signal in such a manner that imaging light which is entered from an object is received by light receiving planes of a large number of photoelectric converting elements arrayed on said image pick-up element, and the imaging light received in the respective photoelectric converting elements is photoelectrically converted so as to produce said picture signal, comprising:
- a step (a) in which a picture signal range having a higher signal level than a predetermined level within a picture signal imaged at a first predetermined time instant is detected as a first high luminance level range, and a picture signal range having a higher signal level than said predetermined level is detected as a second high luminance level range within a picture signal imaged at a second predetermined time instant;
- a step (b) in which a change-component between said first high luminance level range and said second high luminance level range is detected; and
- a step (c) in which the amount of said imaging light is controlled in response to said first predetermined time instant, said second predetermined time instant, and said change-component;
- said step (c) further predicts a fourth predetermined time instant after said second predetermined time instant based upon said first predetermined time instant, said second predetermined time instant, and said detected change-component, at which the range of the picture signal having the signal level higher than said predetermined level is imaged, and a dimension of said range is larger than, or equal to a predetermined dimension; and predicts said range of the picture signal having the signal level higher than said predetermined level at said predicted fourth predetermined time instant; and controls the transmission light amount of said transmission light amount varying unit at said third predetermined time instant in response to said predicted picture signal range.

* * * * *